Patented June 8, 1948

2,443,078

UNITED STATES PATENT OFFICE 2,443,078

ALKYLPYRIMIDOPYRAZINES AND PROCESS OF PREPARING SAME

John H. Mowat, Pearl River, N. Y., assignor, by mesne assignments, to American Cyanamid Company, New York, N. Y., a corporation of Maine No Drawing. Application December 8, 1945, Serial No. 633,870

7 Claims. (Cl. 260—250)

The present invention relates to new organic compounds. More particularly, it relates to carboxyalkyl and alkylpyrimidopyrazines and to methods of preparing the same.

The new compounds may be illustrated by the following formula

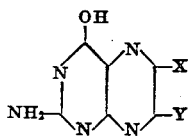

in which one of X and Y represents an alkyl or carboxyalkyl radical. When one of X or Y represents such a radical the other is hydrogen.

Generally speaking, the compounds of the present invention are white to yellowish solids. They are soluble in hot water, dilute alkali and in relatively strong acid. The compounds are prepared by the reaction of 2,4,5-triamino-6-hydroxy pyrimidine and a compound having the formula

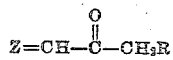

in which R is a member of the group consisting of hydrogen, alkyl and carbalkoxy radicals and Z is oxygen or two alkoxy radicals.

Of the reactants, 2,4,5-triamino-6-hydroxypyrimidine is a known compound and may be prepared by methods which have been described in the chemical literature. As is also well known, this compound may exist in one or more tautomeric forms, such as:

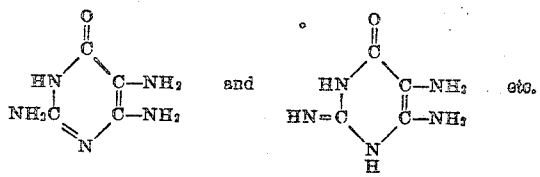

Whether or not the compound exists in the keto form or the enol form probably depends upon the pH of the medium in which it is dissolved. In acid media the compound most likely exists in keto form whereas in alkaline media it exists as the enol form. It will also be noted that the 2-amino group may also be tautomeric with an imino group. As will be understood by those in the art, any of the tautomeric forms may be used in the same chemical reactions in like manner and reference hereinafter to the use of one tautomeric form includes the use of the others. Obviously, the final product may exhibit the same kind of tautomerism.

The preferred product of the present invention is 2-amino-4-hydroxy-6-methylpyrimido [4,5-b] pyrazine; that is, when X in the general formula is a methyl radical and Y is hydrogen. This product is prepared by reacting 2,4,5-triamino-6-hydroxypyrimidine with a dialkoxy aceto acetic acid ester, such as methyl-gamma, gamma-dimethoxy aceto acetate. This latter compound is represented by the formula for the intermediates when R is a carbomethoxy radical and Z represents two methoxy radicals. The first product of this reaction is a 2-amino-4-hydroxy-6-pyrimido [4,5-b] pyrazine acetic acid which is easily decarboxylated by heating at a temperature of from about 200° C. to about 350° C. for from ½ hour to 10 hours to yield 2-amino-4-hydroxy-6-methylpyrimido [4,5-b] pyrazine. Of course, other esters of dialkoxy aceto acetic acid can be used, such as ethyl-gamma, gamma-diethoxy aceto acetate, propyl-gamma, gamma-dipropoxy aceto acetate, and the like.

Compounds of the invention in which Y is an alkyl radical and X is hydrogen may be prepared by reacting 2,4,5-triamino-6-hydroxypyrimidine, or one of its tautomers, with an alkyl glyoxal acetal. This latter compound is represented by the formula for the intermediates when R is hydrogen or alkyl, and Z represents two carbalkoxy groups. There are several alkyl glyoxal acetals which may be used with the 2,4,5-triamino-6-hydroxypyrimidine to produce products of the invention. Among these may be mentioned methyl glyoxal dimethyl acetal, methyl glyoxal diethyl acetal, ethyl glyoxal diethyl acetal, propyl glyoxal diethyl acetal, methyl glyoxal dipropyl acetal, etc.

As the products of the present invention contain an amino group and an acidic hydroxyl group, in at least one of its tautomeric forms, it will be apparent that both acid and cationic salts may be prepared. Salts of strong mineral acids, such as hydrochloric and sulfuric acid, are obtained by merely treating the product with the desired acid. Salts with cations may be prepared, for example, by allowing the product to crystallize from an aqueous solution of a strong alkali, such as sodium hydroxide. Salts of ammonia, ethanolamine, morpholine, or the like, may also be prepared by simple neutralization. Salts of metals, such as zinc, silver, nickel, copper, etc. may be prepared from the alkali metal salt by metathesis.

The products of the present invention are useful as intermediates in the synthesis of compounds having biological activity. This is particularly true in the case of the preferred product 2-amino-4-hydroxy-6-methylpyrimido [4,5-b] pyrazine.

The invention will now be described in greater detail by means of the following examples in which products of the invention are prepared from representative intermediates.

*Example 1*

A suspension of 2,4,5-triamino-6-hydroxypyrimidine (7.5 g.) in 50 cc. of glacial acetic acid was treated with 9 g. of methyl-gamma,gamma-dimethoxy acetoacetate (prepared by method described in J. A. C. S. 41 812 (1919)). The mixture was stirred and heated on the steam bath for 20 minutes and then treated with 50 cc. of water. After heating and stirring for an additional 30 minutes the mixture was cooled and the solid was filtered off, washed with water and dried. The solid was then dissolved in alkali, decolorized with charcoal and reprecipitated with acetic acid. A portion of this crude product was then recrystallized from alkali and a solution of the crystalline sodium salt was then acidified. The precipitated 2-amino-4-hydroxy-6-pyrimido [4,5-b] pyrazine acetic acid was collected, washed with water and alcohol and dried.

*Example 2*

A quantity of 2-amino-4-hydroxy-6-pyrimido [4,5-b] pyrazine acetic acid was heated for about six hours at 270° C. in an atmosphere of nitrogen. During this time carbon dioxide was slowly given off. The residual solid was dissolved in a dilute solution of sodium hydroxide, treated with activated charcoal, and filtered, and then reprecipitated by adjustment of the solution with hydrochloric acid at a pH of 4. The product was then redissolved in a warm solution of sodium hydroxide and adjusted to a pH of 7.1, filtered, and cooled. The precipitate which formed was recrystallized from a small volume of 5 N sodium hydroxide solution. The isolated crystalline sodium salt was then acidified and nearly pure 2-amino-4-hydroxy-6-methylpyrimido [4,5-b] pyrazine was collected. The product was further purified by recrystallization in hot water. Chemical analysis of the product compared favorably with the calculated values for $C_7H_7ON_5$.

*Example 3*

A small quantity of 2-amino-4-hydroxy-6-pyrimido [4,5-b] pyrazine acetic acid was heated at 270° C. for about 5 hours in an atmosphere of nitrogen. The residue was dissolved in water at pH 7 and extracted with butanol. The butanol solution was then evaporated to dryness in vacuo. The residue was taken up in a little dilute alkali, decolorized with charcoal, and filtered. The product, 2-amino-4-hydroxy-6-methyl pyrimido [4,5-b] pyrazine, was reprecipitated by acidification to pH 4 with hydrochloric acid. This material was then recrystallized with hot water and finally recrystallized twice in a solution of sodium hydroxide as the sodium salt.

*Example 4*

A solution of 0.5 g. of 2,4,5-triamino-6-hydroxy pyrimidine and 0.6 g. of methyl glyoxal diethyl acetal in 25 cc. of 4 N hydrochloric acid was heated on a steam bath for one and one-half hours. The reaction mixture was cooled and neutralized to a pH of 4 with sodium hydroxide. It was then centrifuged and the solid product washed and dried. A yield of 0.6 g. (95%) of 2-amino-4-hydroxy-7-methyl pyrimido [4,5-b] pyrazine was obtained. Oxidation with alkaline permanganate gave 2-amino-4-hydroxy-7-pyrimido [4,5-b] pyrazine carboxylic acid which had been prepared by a different method.

I claim:

1. Compounds having the general formula:

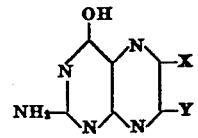

in which one of X and Y is a member of the group consisting of alkyl and carboxyalkyl radicals, the other being hydrogen.

2. 2-amino-4 - hydroxy - 6 - methyl pyrimido [4,5-b] pyrazine.

3. 2-amino-4-hydroxy - 7 - methyl pyrimido [4,5-b] pyrazine.

4. A method of preparing 2-amino-4-hydroxy-6-methyl pyrimido [4,5-b] pyrazine which comprises mixing together in a solvent and heating 2,4,5-triamino-6-hydroxypyrimidine with an alkyl ester of gamma,gamma-dialkoxy aceto-acetic acid to obtain 2-amino-4-hydroxy-6-pyrimido [4,5-b] pyrazine acetic acid and heating said compound within the range of from about 200° C. to about 350° C. to decarboxylate it and recovering 2-amino-4-hydroxy - 6 - methylpyrimido [4,5-b] pyrazine.

5. A method of preparing 2-amino-4-hydroxy-6-methyl pyrimido [4,5-b] pyrazine which comprises heating 2,4,5-triamino-6-hydroxypyrimidine with methyl - gamma,gamma - dimethoxy aceto-acetate in a solvent to obtain 2-amino-4-hydroxy-6-pyrimido [4,5-b] pyrazine acetic acid and further heating said compound to within the range 200° C. to about 350° C. to obtain 2-amino-4-hydroxy-6-methyl pyrimido [4,5-b] pyrazine and recovering the said pterin.

6. A method of preparing 2-amino-4-hydroxy-7-methylpyrimido [4,5-b] pyrazine which comprises the step of mixing together in a solvent and heating 2,4-5-triamino-6-hydroxy pyrimidine and an acetal of methyl glyoxal whereby 2-amino-4-hydroxy-7-methylpyrimido [4,5-b] pyrazine is formed and recovering the said pterin.

7. A method which comprises mixing together in a solvent and heating 2,4,5-triamino-6-hydroxy pyrimidine and a compound of the group consisting of those having the formula

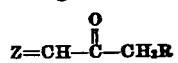

in which Z represents two alkoxy radicals and R represents a radical of the group consisting of hydrogen, alkyl, and carbalkoxy radicals, and after reaction thereof recovering a pterin having the formula

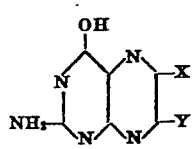

in which one of X and Y is a member of the group consisting of alkyl and carboxyalkyl radicals, the other being hydrogen.

JOHN H. MOWAT.

REFERENCES CITED

The following references are of record in the file of this patent:

Chemical Abstracts, vol. 39 (1945) page 4084 [2,5].